A. BRISBANE.
VEHICLE WHEEL.
APPLICATION FILED MAY 4, 1907.
959,706.
Patented May 31, 1910.
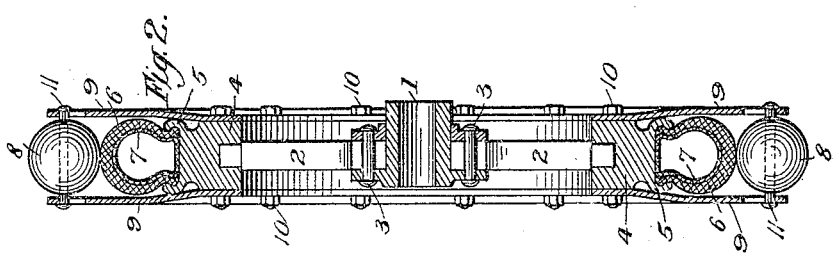
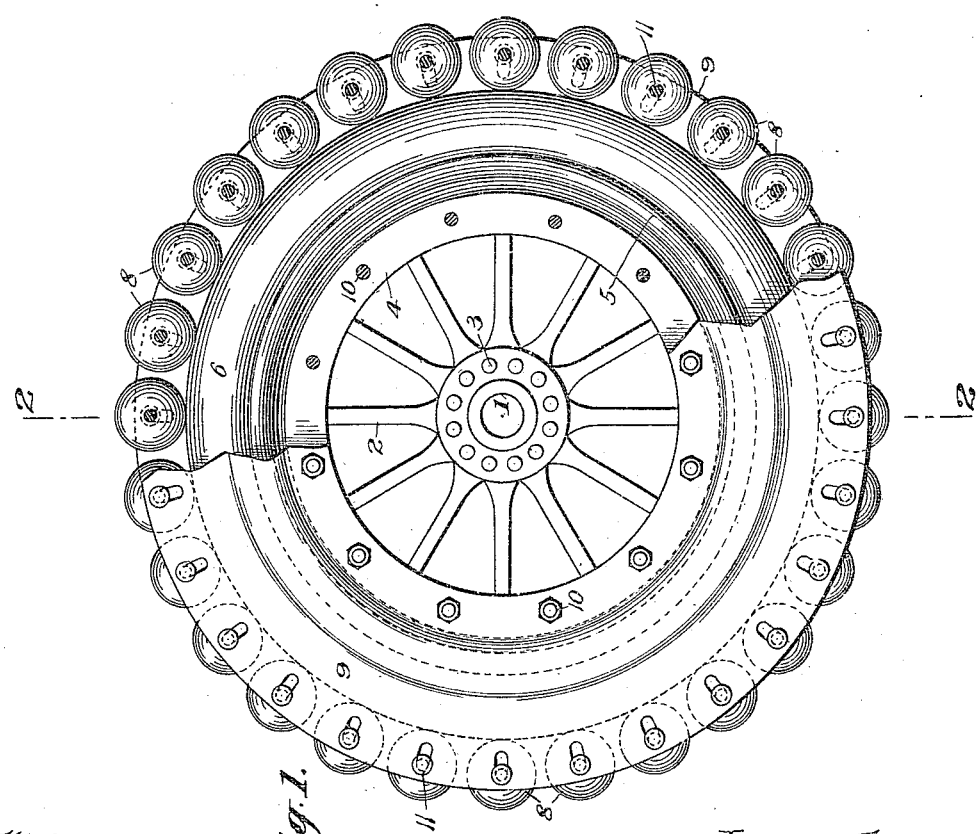
Witnesses:
P. F. Kehoe
A. Journeay.
Inventor:
Arthur Brisbane
by his Attys:

UNITED STATES PATENT OFFICE.

ARTHUR BRISBANE, OF NEW YORK, N. Y.

VEHICLE-WHEEL.

959,706.   Specification of Letters Patent.   Patented May 31, 1910.

Application filed May 4, 1907. Serial No. 371,872.

*To all whom it may concern:*

Be it known that I, ARTHUR BRISBANE, a citizen of the United States, residing at New York city, county of New York, and State of New York, have invented certain new and useful Improvements in Vehicle-Wheels, fully described and represented in the following specification and the accompanying drawings, forming a part of the same.

This invention relates to improvements in vehicle wheels.

Wheels for motor and like vehicles have been heretofore provided with ordinary pneumatic tires for taking up the shocks caused by any unevenness in the surface over which the vehicle passes. These pneumatic tires are very expensive, both because of the high first cost and because of their liability to puncture, which renders them useless, and the rapidity with which they wear out.

It is one object of the present invention to provide a construction by which the pneumatic tire forming the resilient or elastic portion of the wheels now used for motor vehicles and the like is kept out of contact with the surface over which the wheel passes, the tire being placed on the inside of and away from the tread surface of the wheel, so that the tire, not being subjected to direct wear, will maintain its elasticity, and at the same time not readily wear out.

It is a further object of the invention to provide an improved tread or tread surface for the vehicle wheel, by which the tire is kept out of direct contact with the road surface.

It is a further object of the invention to produce a construction which may be applied to an ordinary motor car wheel which shall be simple to make and attach, durable, and the parts of which, which are subjected to direct wear, when worn out may be readily replaced with new parts.

For a full understanding of the invention, a detailed description of the same will now be given in connection with the accompanying drawing, in which—

Figure 1 is a side view of a vehicle wheel showing the improvement. Fig. 2 is a vertical section taken on the line 2—2 of Fig. 1.

Referring now to the drawing, which indicates the invention applied to an ordinary motor vehicle wheel, the numeral 1 indicates the hub of the wheel, which is of ordinary construction, to which spokes 2 are bolted at their inner extremities by bolts 3. The spokes 2 are secured at their outer extremities to the ordinary spoke-rim or felly 4. This spoke-rim or felly 4 is, as is usual in such wheel construction, provided with a flange or rim 5, on which rim is fitted the ordinary pneumatic tire, comprising an outer casing or shoe 6, and inner tube 7, this shoe and tube forming the resilient element of the wheel.

As so far described the wheel is of the usual construction employed with motor and like vehicles. I provide a wheel of this character with an improved tread or tread surface which comes in direct contact with the surface over which the wheel travels and removes the pneumatic tube or shoe from direct contact with such surface. This tread or tread surface includes a plurality of tread members, all or any one of which may be removed when injured, and which are composed of some suitable durable material, and this tread is furthermore so arranged as to contact with the resilient element of the wheel,—as shown in the drawing, the shoe,—the tread members being so arranged as to have a limited movement toward and away from the shoe to compensate for any unevenness in the surface over which the wheel passes and to provide the necessary resiliency in the wheel. The construction of the tread members making up this tread surface, which receive the direct wear of the road, may be somewhat varied. In the particular construction shown, this tread surface consists of a plurality of tread members 8. The number of these tread members may be varied, but a sufficient number will be provided, and they will be sufficiently close together to form a practically continuous tread surface. These tread members 8 are, as shown in the drawing, solid spherical bodies and are preferably made of wood, although metal or hard rubber or other suitable durable material may be employed if desired. These tread members, as shown, contact with the resilient or elastic element of the wheel and are mounted so as to have a limited radial movement with respect to the resilient element, so that when these tread members come in contact with any unevenness in the surface over which the wheel passes they are forced down on to the resilient or elastic element and give the desired resiliency to the wheel. These tread members 8 may be mounted in any desired manner to give this result. In the construction shown, there are provided side plates 9, which side plates extend around the circumference of the wheel and are secured at their inner edges to the felly. In the best constructions, as shown, these side plates will be secured to the spoke-rim or felly by means of bolts 10, so that they can be readily taken off if it becomes necessary to get at the shoe or tube. These plates 9 are slotted at their upper extremities, and in these slots are adapted to work bolts 11 by which the tread members 8 are carried and supported. The tread members thus have a radial movement with respect to the shoe or tube, such movement being limited by the depth of the slots. These slots are so positioned in the plates, and the tread members are of such dimensions, that the upper edges of the tread members will always project beyond the upper edges of the plates, so that the plates will not come in contact with the surface over which the wheel passes.

It will be seen that by the use of a wheel constructed and arranged in accordance with the foregoing description, I have overcome the disadvantages arising from the use of ordinary pneumatic tires, and at the same time have devised a vehicle wheel which has the desired resiliency necessary for motor vehicles and the like, the parts of which are so constructed and arranged as to be easily got at and readily removed and replaced by new parts, as the old parts become useless or worn out.

What I claim is:—

In a vehicle wheel, the combination with a spoke-rim or felly, of a tube of elastic material extending completely around the outer periphery of the felly, side plates secured to the felly at their lower extremities and slotted at their upper extremities, and a plurality of solid spherical members forming the tread surface of the wheel mounted in the side plates in contact with the tube of elastic material and arranged so as to have a limited radial movement with respect thereto.

In testimony whereof, I have hereunto set my hand, in the presence of two subscribing witnesses.

ARTHUR BRISBANE.

Witnesses:
   J. A. GRAVES,
   T. F. KEHOE.